United States Patent
Dlugokinski

(10) Patent No.: US 8,084,690 B2
(45) Date of Patent: Dec. 27, 2011

(54) GROUND STRAP FOR MOTOR VEHICLES

(75) Inventor: York Dlugokinski, Eglharting (DE)

(73) Assignee: Auto Kabel Managementgesellschaft mbH, Hausen i.W. (DE)

( * ) Notice: Subject to any disclaimer, the term of this patent is extended or adjusted under 35 U.S.C. 154(b) by 974 days.

(21) Appl. No.: 12/065,021

(22) PCT Filed: Sep. 18, 2006

(86) PCT No.: PCT/EP2006/066462
§ 371 (c)(1),
(2), (4) Date: Feb. 27, 2008

(87) PCT Pub. No.: WO2008/034462
PCT Pub. Date: Mar. 27, 2008

(65) Prior Publication Data
US 2010/0218990 A1 Sep. 2, 2010

(51) Int. Cl.
*H01R 4/00* (2006.01)
(52) U.S. Cl. .................. 174/74 R; 174/78
(58) Field of Classification Search .......... 174/74 R, 174/78, 84 R, 88 R, 88 C
See application file for complete search history.

(56) References Cited

U.S. PATENT DOCUMENTS

| | | | | |
|---|---|---|---|---|
| 1,789,951 A * | 1/1931 | Terrell et al. | ............... | 439/762 |
| 2,216,363 A | 10/1940 | Crawford | ............... | 175/264 |
| 2,481,978 A * | 9/1949 | Clough | ............... | 343/712 |
| 2,879,320 A * | 3/1959 | Staley et al. | ............... | 174/75 R |
| 3,706,955 A * | 12/1972 | Bunnell | ............... | 439/512 |
| 4,650,274 A * | 3/1987 | Schmid | ............... | 439/801 |
| 4,973,370 A * | 11/1990 | Kreinberg | ............... | 156/50 |
| 5,722,841 A * | 3/1998 | Wright | ............... | 439/98 |
| 6,559,376 B2 * | 5/2003 | Funk et al. | ............... | 174/28 |

FOREIGN PATENT DOCUMENTS

| | | |
|---|---|---|
| DE | 197 45 869 | 5/1998 |
| DE | 102 33 650 A1 | 2/2004 |
| GB | 2 322 839 A | 9/1998 |
| JP | 02-152304 | 12/1990 |
| JP | 2006183625 | 7/2006 |

OTHER PUBLICATIONS

*International Search Report*, International Application No. PCT/EP2006/066462; Date of Mailing Jul. 7, 2007.
Abstract (English) of foreign patent document DE 102 33 650. Abstract provided by esp@cenet database—Worldwide.
Abstract (English) of foreign patent document DE 197 45 869. Abstract provided by esp@cenet database—Worldwide.
Abstract (English) of foreign patent document JP 02-152304. Abstract provided by the Japanese Patent Office.
Abstract (English) of foreign patent document JP 2006183625. Abstract provided by esp@cenet database—Worldwide.

* cited by examiner

*Primary Examiner* — William Mayo, III
(74) *Attorney, Agent, or Firm* — Sunstein Kann Murphy & Timbers LLP

(57) ABSTRACT

A ground cable system for motor vehicles includes a ground cable that is a foil conductor. The ground cable is located between a vehicle body having electrical ground reference potential and a vehicle attachment part which is electrically insulated from the body.

13 Claims, 3 Drawing Sheets

GROUND STRAP FOR MOTOR VEHICLES

FIELD OF THE INVENTION

The invention relates to a ground cable for motor vehicles, the ground cable being located between a vehicle body having electrical ground reference potential and a vehicle attachment part, which is electrically insulated against the bodywork. Furthermore the invention relates to a connecting system for a ground cable in a motor vehicle.

BACKGROUND OF THE INVENTION

In motor vehicle construction electrically conductive parts must be connected to each other so that all components fitted to the car body have the same electrical potential. It is common knowledge that the car body of a motor vehicle is always connected to the negative terminal (B−) of the battery. Electric consumers tap the electrical ground reference potential through the car body parts and are connected by a separate cable to the positive terminal (B+) of the battery.

Particularly in the case of moving parts, and also in the case of components bonded (glued) to the car body, these components must be connected to the car body electrically. Preferably in the case of doors, tailgates, bonnets, and bonded roofs conventionally the connection is made by a ground cable. German Patent DE 698 21 153 T2 discloses a connection between a car door and the rest of the car body. In the case of the contact method described, a body wiring harness is connected to a first electrical door connection by means of a body wiring harness connection and a flexible bellows-type hose. The connection is bolted either on a front edge of the door reinforcement panel or on the electrical door connection. It has however been shown that the use of conventional cables has disadvantages with respect to flexibility. In addition round cables, in particular of the twisted wire variety, have negative properties with regard to electromagnetic compatibility. Interference voltages can build up in these connections.

SUMMARY OF THE INVENTION

Starting from the disadvantages described, the object of the invention was to provide a flexible, low-interference ground connection between a vehicle body and parts, which are not connected to the vehicle body electrically.

This object is achieved according to the invention by a ground cable in the form of a foil conductor. The use of a foil conductor for the ground connection provides high flexibility about an axis of rotation between car body and moving part. The use of a foil conductor results in improved electromagnetic compatibility compared to a round conductor. Interference voltages are better discharged through the foil conductor than through a round conductor. The use of the foil conductor renders the possibility of a ground connection between car body and attachment part with minimum space requirements. In contrast to round conductors a foil conductor can be inserted in small gaps, so that no separate space requirements are needed for the ground connection.

The use of a foil conductor with a thickness of between 0.05 mm and 0.2 mm is preferable. The cross-sectional area of the foil conductor must be large enough to provide any current load-capacity demanded. The thickness of the foil conductor can be determined according to its width.

Particularly preferably the foil conductor is made of aluminium or copper foil. Both aluminium and copper foil are easy to handle and economic. As regards working with aluminium or copper foil it is advantageous if the raw materials are supplied for processing on coils and unwound from the coils during processing. This allows for continuous, economic production.

In Order to Protect the Foil Conductor from Corrosion it is Proposed that the Core is tin-plated. Preferably the core is made of copper or aluminium foil and tin-plated.

Corrosion protection in accordance with an advantageous exemplary embodiment is achieved if the core of the foil conductor is anodized. Likewise it is preferable if the core of the foil conductor is coated with a plastic. Such a coating can take place preferably by means of over-coating or lamination. For plastic coating PET (polyethylene terephthalate) or PI (polyimide) are particularly suitable as coating materials.

In accordance with another advantageous exemplary embodiment it is proposed that the foil conductor electrically connects a vehicle attachment part made of aluminium to a vehicle body made of steel. If vehicle attachment parts made of aluminium are used, it frequently occurs that an aluminium oxide layer forms on the surface of the vehicle attachment part, before this has been fitted to the car body. The aluminium oxide layer however prevents good electrical contact between attachment part and body. If the attachment part must be electrically connected to the ground reference potential, it is proposed this is ensured by means of the foil conductor. Ultrasonic welding to connect the foil conductor to the body and the vehicle attachment part is suitable for example.

Particularly preferably foil conductors are suitable for connecting a pivoting vehicle attachment part to the body. As mentioned above, the foil conductor is distinguished by high flexibility along one axis of rotation. Furthermore only a small space is needed to permit electrical connection between pivoting vehicle attachment part and body.

The use of a foil conductor is particularly preferable for connecting a door, tailgate, bonnet, or bonded roof to the body. If vehicle attachment parts are bonded with the body, a separate electrical connection must also be made, since the bonded components are insulated against one another along the adhesive joint.

A particularly simple assembly is rendered possible by virtue of the fact that the foil conductor on at least one end has a first opening to insert a bolt and second opening to receive a positioning lug, so that when the foil conductor is bolted onto the bodywork or the vehicle attachment part, the flat conductor is held in a bolting position by the positioning lug and the bolt engages in a corresponding thread through the first opening. When the foil conductor is being bolted on, it may happen that this is subjected to torque. As a result of the foil conductor being snapped into a positioning lug, the torque is taken up through this and the foil conductor is held in the bolting position. The foil conductor is prevented from rotating or distorting by the positioning lug. This simplifies assembly and reduces the probability of failure.

A further object is a connecting system for a ground cable described above, characterized by a seating, to hold the foil conductor, with a positioning lug, wherein the positioning lug engages in an opening of the foil conductor, and a fixing clip snaps into the seating pressing the foil conductor against the positioning lug, the fixing clip having an opening to insert a bolt. As regards assembly, it is always necessary that this is tolerant to failure and can be carried out rapidly. The foil conductor can be easily fixed to the seating by using a fixing clip. After the foil conductor has been mechanically fixed to the seating, this can be locked on the seating by bolting. Electrical contact between foil conductor and seating can be facilitated by the bolt.

It has been shown that the foil conductor is maintained particularly well in the seating, if the seating has a recess to receive at least one end of the foil conductor. At the same time this recess can correspond to the shape of the foil conductor, so that the foil conductor is held on the seating just by the recess. The recess is preferably adapted to the thickness of the foil conductor, so that the foil conductor inserted in the recess terminates flush with the surface of the seating.

Particularly good fixing of the foil conductor to the seating is ensured by virtue of the fact that the positioning lug is arranged in the recess.

During assembly, fixing of the foil conductor is particularly simply ensured by providing the fixing clip with a corresponding collar running at least partly around its inside, with a groove arranged on the outer peripheral face of the seating, so that the collar snaps into the groove in order to lock the fixing clip. For assembly, the fixing clip only needs to be pushed onto the seating, whereupon the fixing clip snaps into the seating. The foil conductor, arranged in the seating, is held in position by the snap-action. Afterwards the foil conductor can be locked on the seating by a bolt.

As already mentioned above it is preferable if the fixing clip secures the foil conductor in the seating and the positioning lug takes up any torque generated while the foil conductor is being bolted on. The positioning lug prevents the foil conductor from being distorted or from being rotated and possibly damaged while being bolted on.

The use of a foil conductor as a ground cable for vehicles permits flexible, economic and virtually trouble-free contact of vehicle attachment parts with electrical ground reference potential. The invention is described in detail below on the basis of a drawing showing exemplary embodiments, wherein there is shown:

DESCRIPTION OF ILLUSTRATIVE EMBODIMENTS

Figure 1A:
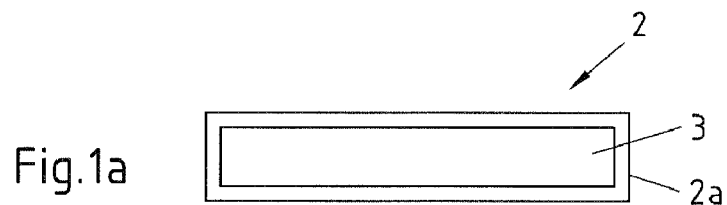
FIG. 1a a first cross section of a foil conductor according to the invention.
Figure 1B:
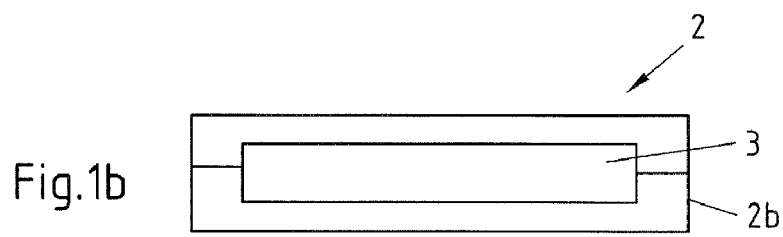
FIG. 1b a second cross section of a foil conductor according to the invention.

FIG. 1a shows a first cross section of a foil conductor 2 according to the invention. The core 3 of the foil conductor 2 is made of aluminium. The surface of the core 3 is coated with an aluminium oxide layer 2a. The aluminium oxide layer 2a is applied to the core 3 by means of anodizing. The aluminium oxide layer 2a provides insulation of the core 3 against other components. Apart from the aluminium oxide layer 2a it is also possible to apply a plastic film, i.e. PET or PI. This is shown in FIG. 1b. It is shown that the core 3 of the foil conductor 2 is laminated by means of a plastic foil 2b. The plastic foil 2b can be applied by lamination or over-coating. The plastic foil 2b provides insulation of the core 3.

In order to improve the mechanical properties of the foil conductor 2 it is also proposed that the core 3 is coated with a tin layer by means of tin plating.

Figure 2:
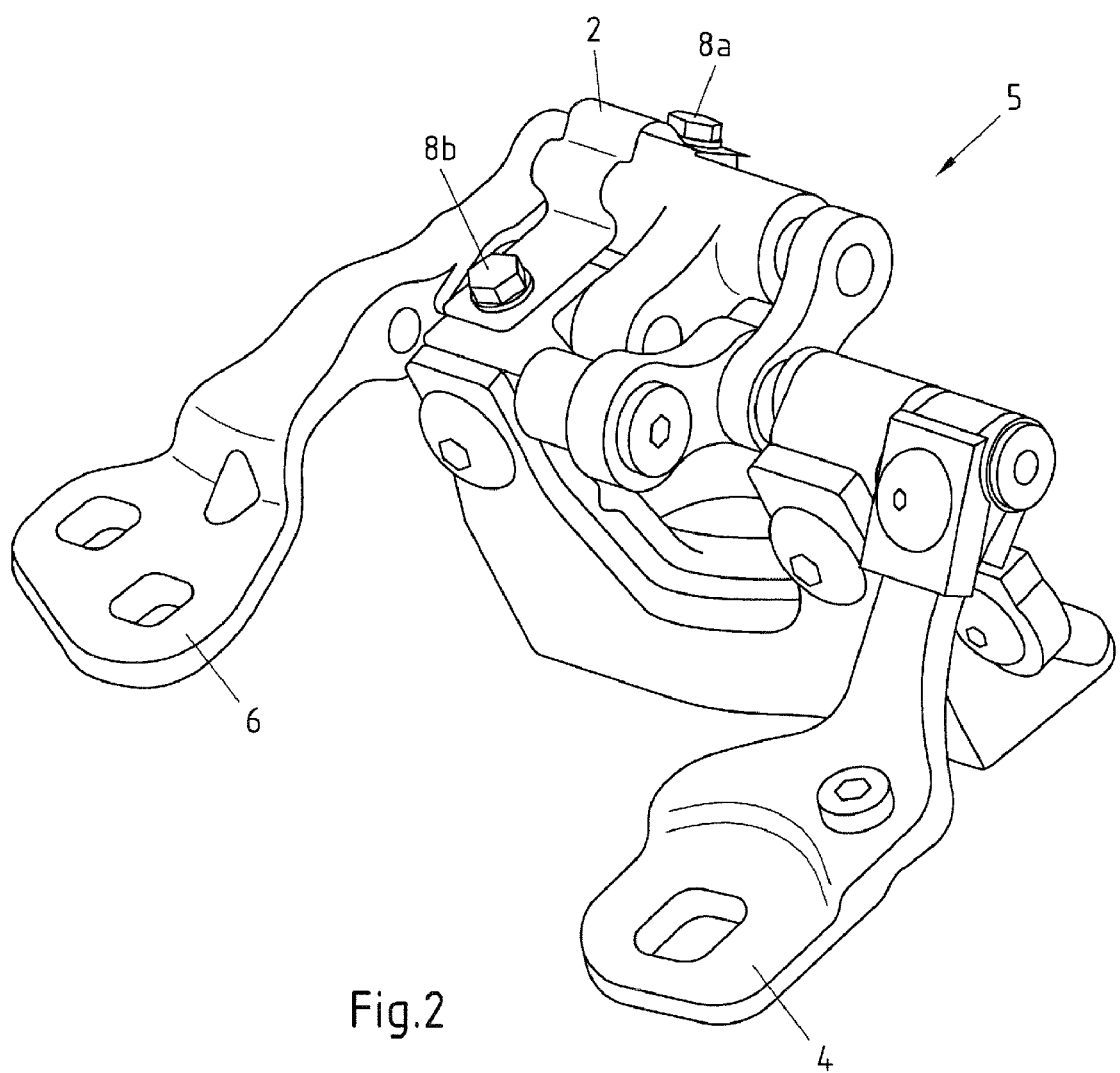
FIG. 2 a view of a connection between hinge parts of a motor vehicle.

FIG. 2 shows a view of a door hinge 5. The door hinge 5 is friction-locked connected to the body or a door by joining parts 4 and 6. The joining parts 4, 6 enable the door to be opened or closed. The hinge 5 has the disadvantage that electrical contact between the joining part 4 and the joining part 6 is not ensured. As the result of lubricants and plastic components it may be that the joining part 4 is electrically insulated against the joining part 6. For this reason a foil conductor 2 is placed between the joining part 4 and the joining part 6.

This foil conductor 2 is bolted to the joining part 6 and the joining part 4 by means of bolts 8a, 8b in each case. The foil conductor 2 is electrically connected with the joining parts 4, 6 by means of the bolts 8a, 8b. The joining parts 4, 6 make electrical contact with one another by means of the bolts 8 and the foil conductor 2.

As can be seen the foil conductor 2 only requires a small space so that the electrical contact can be arranged directly on the hinge 5. In the case of conventional connections with round conductors, contact is only possible between body and door due to the reduced flexibility. Direct contact in the hinge 5 was not possible in the case of conventional round conductors, since these did not have the necessary flexibility and their curve radius was more heavily restricted than is the case with foil conductors according to the invention.

Figure 3:
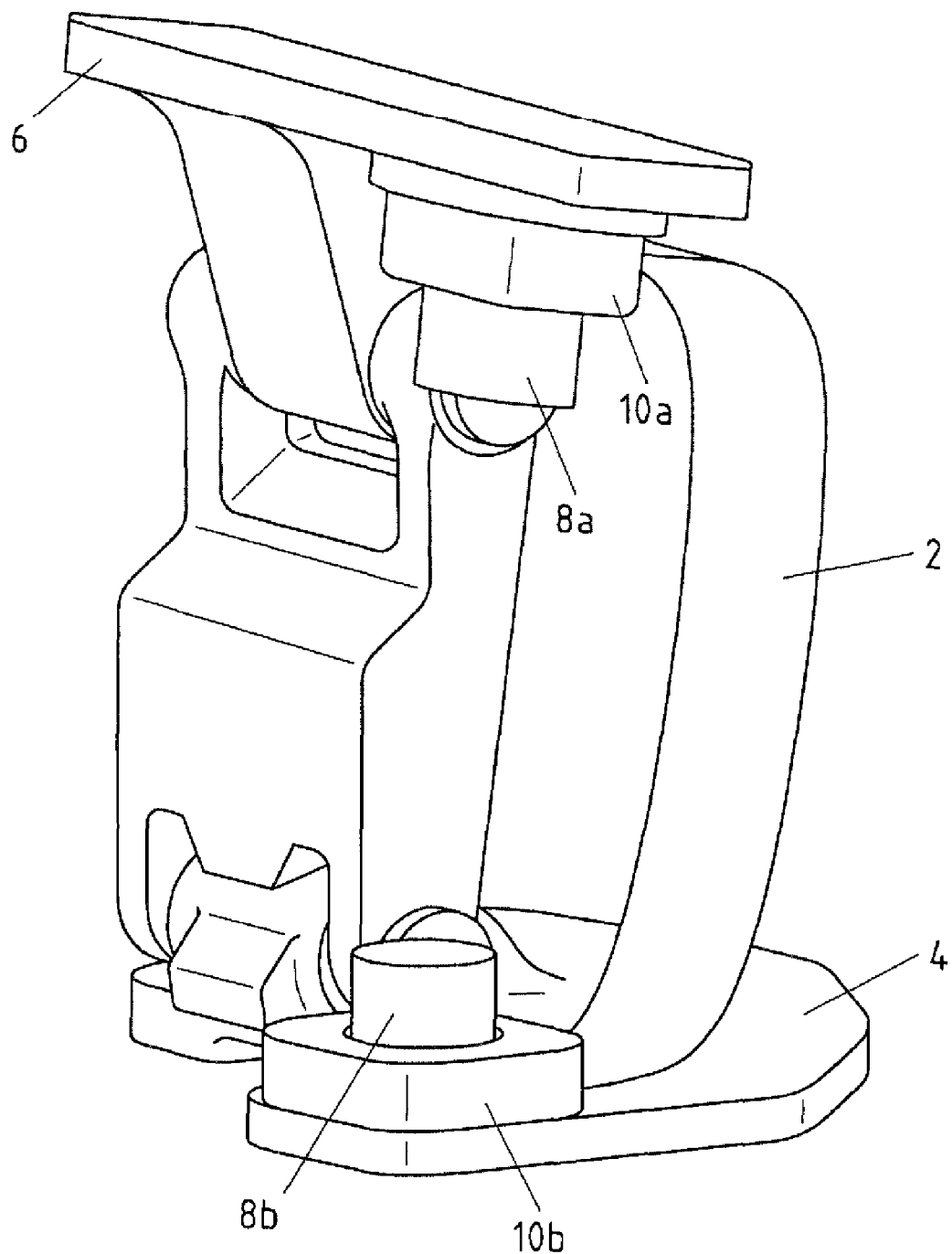
FIG. 3 a further view of a use of hinge parts.

FIG. 3 shows the hinge 5 in the fitted condition. The foil conductor 2 in the embodiment illustrated in FIG. 3 is arranged in seatings on the joining parts 4 and 6. The foil conductor 2 is held in the seatings by means of fixing clips 10 and bolted on the joining parts 4, 6 by means of the bolts 8.

Figure 4:
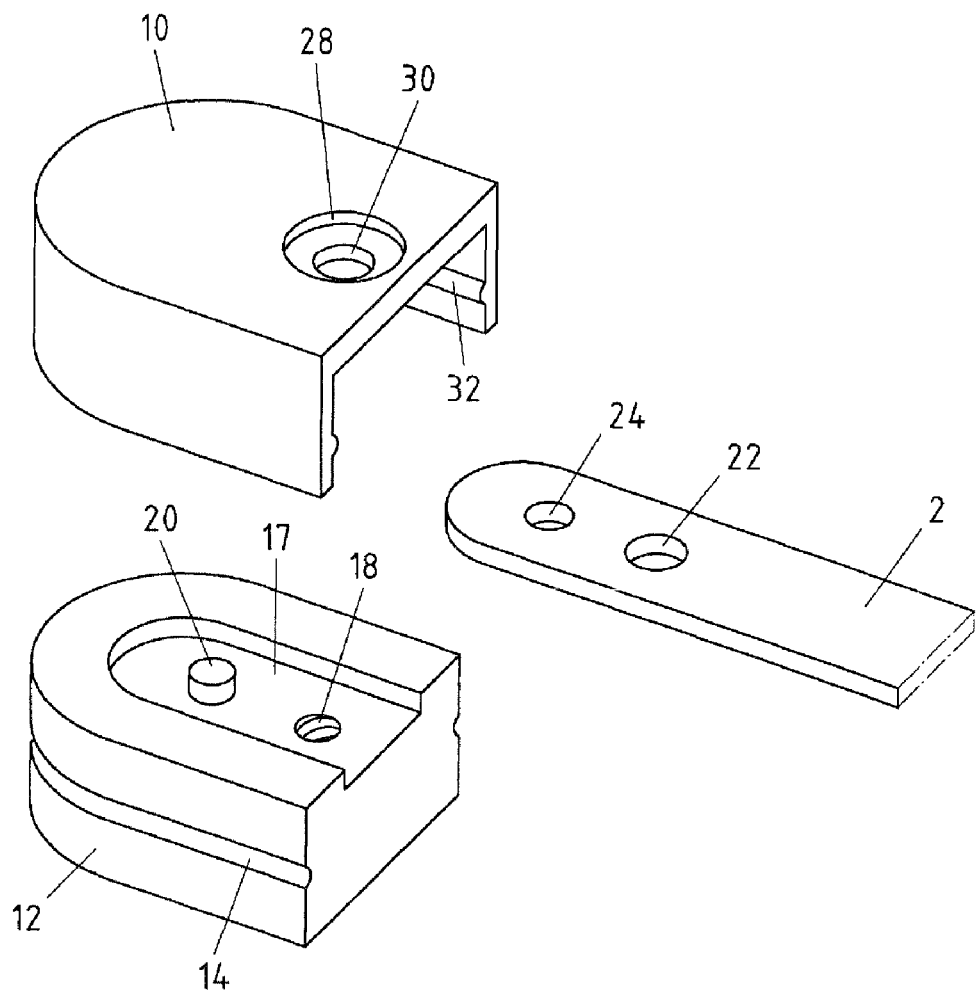
FIG. 4 a view of a seating, a foil conductor and a fixing clip.

FIG. 4 shows a view of a seating 12 and a fixing clip 10. The seating 12 has a positioning lug 20, a drilled hole 18 with internal thread, a recess 17 and a groove 14.

Also illustrated is a foil conductor 2 with a first opening 24 for receiving the positioning lug 20 and a second opening 22, which corresponds with the drilled hole 18, and in which a bolt 8 can be inserted. Finally a fixing clip 10, which has a drilled hole 30, with a recess 28 for receiving a bolt head, is illustrated. Furthermore the fixing clip 10 has a collar 32 running around its interior edge.

In order to fit the foil conductor 2 this is inserted into the recess 17. The recess 17 is configured so that the foil conductor 2 terminates flush with the surface of the seating 12. If the foil conductor 2 is inserted into the recess 17, the positioning lug 20 engages in the first opening 24. The second opening 22 lies directly over the drilled hole 18.

After the foil conductor 2 has been inserted into the recess 17, the fixing clip 10 is pressed by means of the seating 12. At the same time the collar 32 snaps into the groove 14. The collar 32 and the groove 14 are arranged in such a way that the fixing clip 10 snaps into the seating 12 so that the foil conductor 2 is pressed into the recess 17. The drilled hole 30 is located in the fixing clip 10 in such a manner that, after the fixing clip 10 has been snapped into the seating 12, it lies over the drilled hole and the second opening 22. The foil conductor 2 is held firmly in the seating 12 by the snap-action of the fixing clip 10. Afterwards the foil conductor 2 is locked on with a bolt, which projects through the openings 30, 22 into the drilled hole 10. Because the bolt is supported in the recess 28, this prevents any torque from affecting the foil conductor 2 while it is being bolted on. If nevertheless any torque does affect the foil conductor 2, this is taken up through the positioning lug 20, and prevents the foil conductor 2 from rotating or distorting while it is being bolted on.

The foil conductor according to the invention and the connecting system according to the invention permit electrical contact of various components of a motor vehicle at low cost of production. The electrical connection is flexible and virtually trouble-free. The space required is minimal so that contact can be made within the smallest area.

The invention claimed is:

1. Motor vehicles ground cable connecting system comprising:
   a ground cable that is located between a vehicle body having electrical ground reference potential and a vehicle body attachment part, which is electrically insulated from the body, wherein the ground cable is a foil conductor that has one end with a first opening to receive a bolt and a second opening to receive a positioning lug;
   a seating with a recess to receive the one end of the foil conductor;
   a positioning lug arranged in the recess of the seating, wherein the positioning lug engages in the second opening of the foil conductor;
   a hole arranged in the recess of the seating, wherein the hole corresponds to the first opening and is arranged to receive the bolt;
   a fixing clip pressing the foil conductor against the positioning lug while snapping into the seating; and
   an opening arranged within the fixing clip for receiving the bolt;
   so that when the foil conductor is connected to the body of the vehicle attachment part, the foil conductor is held in a bolting position by the positioning lug and the bolt engages in the corresponding hole through the first opening.

2. Motor vehicles ground cable connecting system of claim 1, wherein the foil conductor has a thickness of 0.05 mm-0.2 mm.

3. Motor vehicles ground cable connecting system of claim 1, wherein a core of the foil conductor is made of aluminium or copper foil.

4. Motor vehicles ground cable connecting system of claim 1, wherein the core of the foil conductor is tin-plated.

5. Motor vehicles ground cable connecting system of claim 4, wherein the core of the foil conductor is anodized.

6. Motor vehicles ground cable connecting system of claim 1, wherein a core of the foil conductor is coated with a plastic.

7. Motor vehicles ground cable connecting system of claim 1, wherein a core of the foil conductor is coated with PET or PI.

8. Motor vehicles ground cable connecting system of claim 1, wherein a plastic coating is applied by means of overcoating or lamination.

9. Motor vehicles ground cable connecting system of claim 1, wherein the foil conductor electrically connects a vehicle attachment part made of aluminium to a vehicle body made of steel.

10. Motor vehicles ground cable connecting system of claim 1, wherein the foil conductor connects a pivoting vehicle attachment part to the body.

11. Motor vehicles ground cable connecting system of claim 1, wherein the foil conductor electrically connects to a vehicle attachment part being comprised in the group: door; tailgate; bonnet; bonded roof to the body.

12. Motor vehicles ground cable connecting system of claim 1, wherein the fixing clip has a corresponding collar running at least partly around its inside, with a groove arranged on the outer peripheral face of the seating, so that the collar snaps into the groove in order to lock the fixing clip.

13. Motor vehicles ground cable connecting system of claim 1, wherein the fixing clip secures the foil conductor in the seating so that the positioning lug takes up any torque generated while the foil conductor is being bolted on.

* * * * *